(12) United States Patent
Bandera et al.

(10) Patent No.: US 8,219,062 B2
(45) Date of Patent: Jul. 10, 2012

(54) AMBIENT INFORMATION FOR USAGE OF WIRELESS COMMUNICATION DEVICES

(75) Inventors: Deborah H. Bandera, Austin, TX (US); Sara C. Brumfield, Austin, TX (US); James T. Ray, Austin, TX (US); Debora M. Yang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 973 days.

(21) Appl. No.: 12/178,008

(22) Filed: Jul. 23, 2008

(65) Prior Publication Data

US 2010/0022216 A1    Jan. 28, 2010

(51) Int. Cl.
*H04M 11/00* (2006.01)
*H04M 3/42* (2006.01)

(52) U.S. Cl. ..... 455/405; 455/566; 455/406; 455/414.1; 455/550.1; 455/421

(58) Field of Classification Search ............. 455/406, 455/407, 412.1, 418, 550.1, 566, 154.1, 157.2, 455/405, 414.1, 421; 379/114.16, 114.17; 345/102, 87, 88
See application file for complete search history.

(56) References Cited

U.S. PATENT DOCUMENTS

| | | | |
|---|---|---|---|
| 5,684,861 A | | 11/1997 | Lewis et al. |
| 6,131,024 A | * | 10/2000 | Boltz ............................ 455/405 |
| 6,493,547 B1 | | 12/2002 | Raith |
| 6,529,593 B2 | | 3/2003 | Nelson |
| 6,970,692 B2 | | 11/2005 | Tysor |
| 7,167,699 B1 | | 1/2007 | Kretsinger |
| 7,650,137 B2 | * | 1/2010 | Jobs et al. ...................... 455/405 |
| 2002/0103006 A1 | * | 8/2002 | Doe .............................. 455/556 |
| 2004/0171410 A1 | * | 9/2004 | Deeds ........................ 455/575.1 |
| 2004/0203587 A1 | | 10/2004 | Bekanich |
| 2005/0032505 A1 | | 2/2005 | Himelhoch |
| 2007/0157095 A1 | * | 7/2007 | Bilow et al. ................... 715/744 |
| 2008/0153531 A1 | * | 6/2008 | O'Shaughnessy et al. ... 455/518 |
| 2009/0249252 A1 | * | 10/2009 | Lundy et al. ................. 715/817 |

OTHER PUBLICATIONS

Albrecht Schmidt et al., "Utilizing Mobile Phones as Ambient Information Displays," CHI 2006, Apr. 22-27, 2006, Montreal, Canada, pp. 1-6.

Craig Wisneski et al., "Ambient Displays: Turning Architectural Space into an Interface between People and Digital Information," Published in the Proceedings of the First International Workshop on Cooperative Buildings (CoBuild '98), Feb. 25-26, 1998, © 1998 Springer, pp. 1-11.

* cited by examiner

*Primary Examiner* — Marcos Torres
(74) *Attorney, Agent, or Firm* — Stephen J. Walder, Jr.; John D. Flynn

(57) ABSTRACT

Embodiments that indicate usage information of services for wireless communication devices via ambient elements are disclosed. Some embodiments determine usage of a service for a wireless communication device and manipulate one or more ambient elements to indicate the usage to a user of the device. Various embodiments may determine usage by measuring a quantity of data transferred or measuring a number of voice minutes consumed according to a rate plan. Changing ambient elements may comprise activating vibration modules or changing colors of screen elements, or changing screen brightness of the devices, as examples. Examples of wireless communication devices are cell phones, smartphones, satellite phones, and other types of mobile communication devices that use wireless communication services.

11 Claims, 6 Drawing Sheets

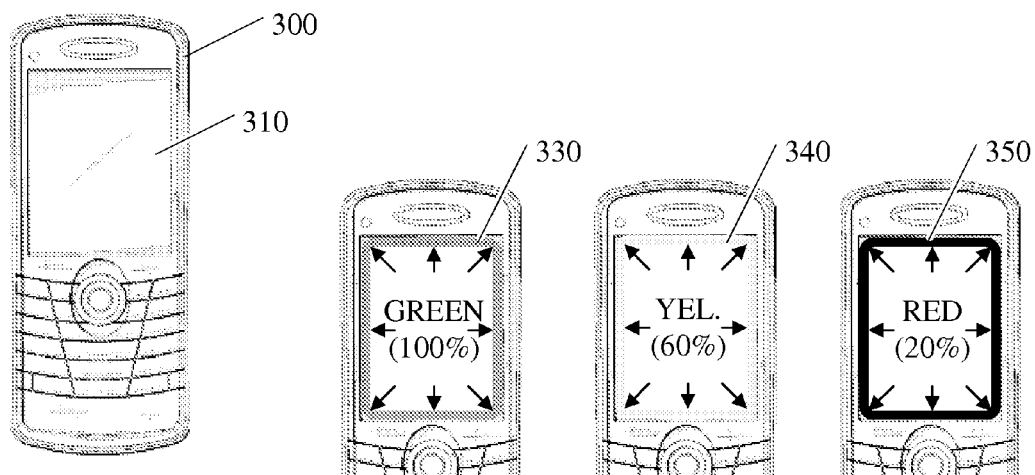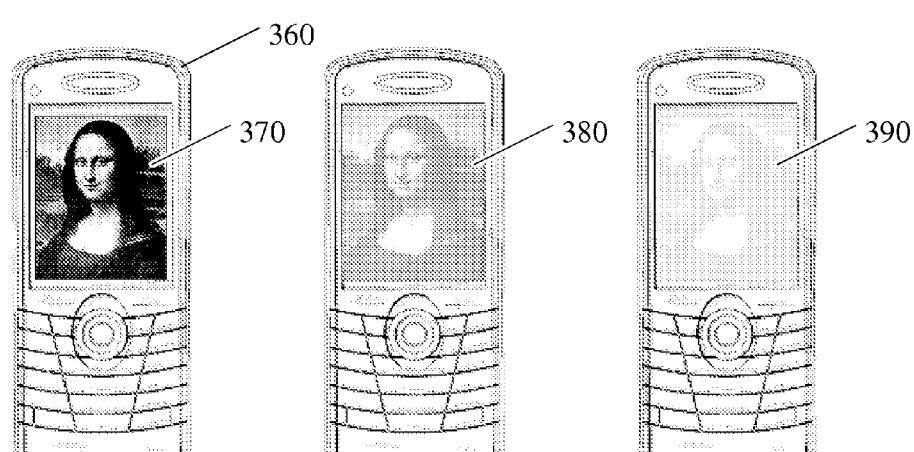

AMBIENT INFORMATION FOR USAGE OF WIRELESS COMMUNICATION DEVICES

BACKGROUND

The present disclosure relates generally to wireless communication devices and more particularly to indicating usage of the communication devices via ambient elements. Wireless communication devices, such as cellular telephones (cell phones) and portable computing devices that use wireless communication technologies, are becoming increasingly popular in the wireless environment of today. For example, cellular services are provided for both business use and personal use via individual cellular devices that connect to networks of different cellular service providers.

Cellular services, or other types of wireless communication services, are usually provided with a monthly or annual payment agreement between a subscriber and a service provider. Typically, each cellular subscriber selects a service usage plan or rate plan that includes a set number of daytime or peak minutes and another set number of night and weekend or off-peak minutes in a set period or cycle (usually monthly) for a given price (e.g., 120 minutes peak, 300 off-peak for a set price per month). The subscriber may also select the rate plan based on the number of text messages and/or data usage available, as well.

Cell phone subscribers select from among a multitude of rate plans, each offering differing amounts of minutes during different times of the day or week. Typically, the subscriber selects a rate plan based on cost and associated minutes available within the plan. If users of these rate plans use more than the available minutes in their rate plans in a particular month, the subscribers end up paying fees for such excess usage. For example, when a subscriber uses more minutes in a given cycle than allotted in his/her service plan, the subscriber is charged a premium for the excess calls. The premium can be expensive, such as subscribers being forced to pay double the base rate for a small number of over-the-plan calls.

BRIEF SUMMARY

Following are detailed descriptions of embodiments depicted in the accompanying drawings. The descriptions are in such detail as to clearly communicate various aspects of the embodiments. However, the amount of detail offered is not intended to limit the anticipated variations of embodiments. On the contrary, the intention is to cover all modifications, equivalents, and alternatives of the various embodiments as defined by the appended claims. The detailed descriptions below are designed to make such embodiments obvious to a person of ordinary skill in the art.

Generally speaking, systems, methods, apparatuses, and computer program products to convey usage information of services for wireless communication devices via ambient elements are contemplated. Some embodiments generally comprise obtaining a usage limit for a service provided by a wireless service provider, determining an amount of usage of the service, comparing the amount of usage with one or more usage thresholds, and indicating that the amount of usage reaches or exceeds a threshold by changing an ambient of the wireless communication device. Various embodiments may determine usage by measuring a quantity of data transferred or measuring a number of voice minutes consumed according to a rate plan. In some embodiments manipulating the ambient element may comprise activating a vibration module, yet comprise changing colors of a band of a display in other embodiments.

Further embodiments comprise apparatuses having an element displayer to show an ambient element on a display of a wireless communication device, a usage determiner to determine an amount of usage of a service, a threshold comparer to compare the amount of usage with one or more usage thresholds, and an element changer to change the ambient element when the amount of usage at least reaches the one or more thresholds. Some embodiments may also include additional elements, such as an option selector to enable the user select a color scheme and/or a usage disabler to prevent or disable the element changer from changing the ambient element on the screen. In some embodiments, the usage determiner may determine usage of a number of wireless communication devices sharing a usage plan.

Further embodiments comprise a computer program product comprising a computer usable medium having a computer readable program, wherein the computer readable program causes the computer to receive a usage limit for a service provided by a wireless service provider, determine an amount of usage of the service for a wireless communication device, compare the amount of usage with one or more usage thresholds, determine that the amount of usage reaches a threshold, and indicate that the amount of usage reaches the threshold by changing an ambient element of the wireless communication device. Some embodiments may change the ambient element by dimming a brightness of the display. In various embodiments, the determination of the amount of usage may comprise determining a number of text messages transferred or calculating a number of voice minutes that a user consumes in a billing period.

Further embodiments comprise a method of obtaining a usage limit for a service provided by a wireless service provider, determining an amount of usage of the service, comparing the amount of usage with one or more usage thresholds and indicating via an ambient element that the amount of usage reaches a threshold of the one or more usage thresholds. Some embodiments also include charging a periodic rate to a user of the wireless communication device for the indication via the ambient element.

Even further embodiments comprise a system having one or more wireless communication towers and one or more computers of a wireless service provider coupled to the wireless communication towers. The computers may determine usage of a service of a wireless communication device and determine when the usage reaches one or more usage thresholds of a usage limit. The embodiments may have an element changer to change an ambient element of the wireless communication device in response to the usage reaching a threshold and an element displayer to show the ambient element on a display of the wireless communication device.

BRIEF DESCRIPTION OF THE SEVERAL VIEWS OF THE DRAWING

Aspects of the various embodiments will become apparent upon reading the following detailed description and upon reference to the accompanying drawings in which like references may indicate similar elements:

FIGS. 3A-3H illustrate how ambient elements of a smartphone may indicate usage information;

DETAILED DESCRIPTION

Figure 1:
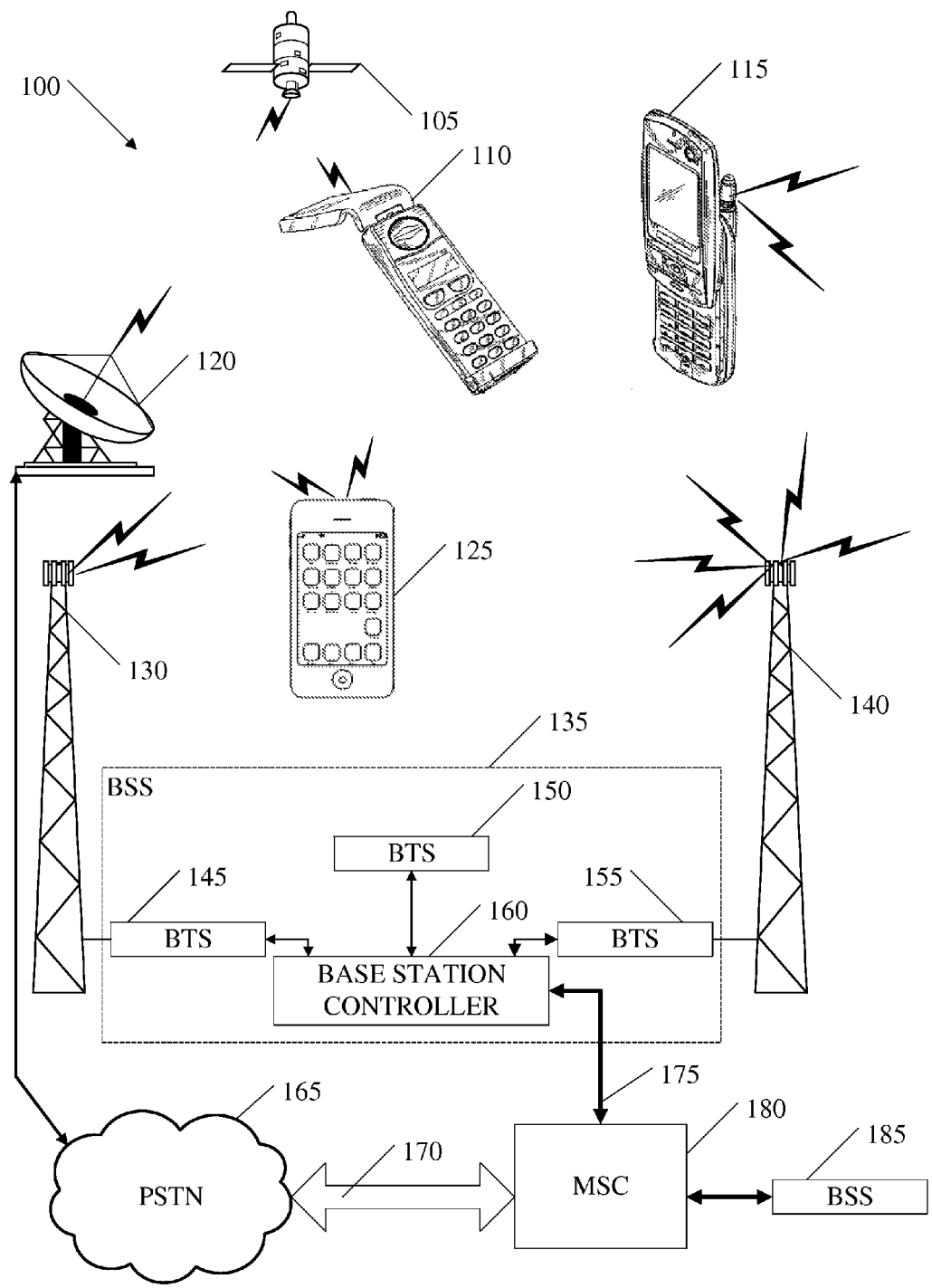
FIG. 1 depicts an embodiment of a system that may use ambient elements of wireless communication devices to indicate usage, comprising communication towers, a base station controller, and various wireless communication devices.

The following is a detailed description of novel embodiments depicted in the accompanying drawings. The embodiments are in such detail as to clearly communicate the subject matter. However, the amount of detail offered is not intended to limit anticipated variations of the described embodiments. To the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Many of the embodiments comprise wireless communication devices, such as cellular telephones, arranged to indicate usage of services for the devices by manipulating one or more ambient elements of the phone. Several of the embodiments may display an ambient element on a display of a wireless communication device. For numerous embodiments, the wireless communication device may determine an amount of usage of a service, such as a number of voice minutes consumed for a rate plan for the device. In the numerous embodiments, the wireless communication device may manipulate or alter the ambient element to indicate the amount of usage of the service to a user.

In many of the following paragraphs, numerous embodiments are discussed using the terms "cellular telephone" or more simply "cell phone". In numerous paragraphs, the terms "telecommunications" and "wireless communications" may also be used. Even so, the use of these terms is for the sake of explanation for those possessing ordinary skill in the art.

Additionally, many of the embodiments are described by referring to a wireless carrier. More generally, embodiments may be interpreted as using a service of a provider of wireless services, or wireless service provider. In other words, a wireless carrier may be one specific example of a wireless service provider, but other providers may also be possible.

Even further, many of the embodiments describe certain functions being performed by a wireless communication device. Discussion for other embodiments illustrate how one or more of those functions may alternatively be performed by devices coupled to or that communicate with wireless communication devices. As one skilled in the art will appreciate, the described functions may often be performed either by the wireless communication devices, apparatuses that communicate with the wireless communication devices, or a combination of one or more functions being performed by the wireless communication devices with one or more functions being performed by apparatuses that communicate with the wireless communication devices.

Other forms of wireless devices that communicate various types of information via differing types of wireless communication technologies also come within the scope of the present teachings. For example, many wireless communication devices may communicate other types of information, in addition to or in lieu of voice information. In many embodiments, the wireless communication devices may use other types of communication services, instead of what may be referred to as cellular mobile telephone service.

Embodiments may employ differing types of systems and services, such as the Advanced Mobile Phone Service (AMPS) or the Global System for Mobile (GSM) communication systems. Consequently, the use of such terms as "cell phone" and "telecommunication" are meant to be interpreted broadly, covering innumerable other types of wireless communication terms and technologies consistent with the present teachings as defined by the appended claims. Additionally, while some of the specific embodiments described below will reference the embodiments with specific configurations, those of skill in the art will realize that embodiments of the present disclosure may advantageously be implemented with other configurations with similar issues or problems.

Turning to the drawings, FIG. 1 illustrates a system 100 that may employ ambient elements of wireless communication devices to indicate information of usage, comprising communication towers 130 and 140, a base station controller 160, and various wireless communication devices such as cell phone 115, smartphone 125, and satellite phone 110. For example, system 100 may enable smartphone 125 to indicate usage information to a person via ambient elements shown on the display of smartphone 125.

A wireline common carrier, an independent telephone company, or a radio common carrier may employ system 100 to provide services of wireless communications to various types of users of communication devices. For example, communication towers 130 and 140 may comprise two cellular towers in a cluster having low-power transmitters that provide cellular communication services to users in a geographic area via communication devices, sometimes referred to as mobile units, such as smartphone 125 and cell phone 115.

The cellular communication services may be provided by, e.g., a commercial wireless carrier or a service provider of wireless communications. Such services may be provided to smartphone 125 and cell phone 115 via radio equipment located at communication towers 130 and 140, with the radio equipment working in conjunction with stationary base station antenna sites such as base transceiver station (BTS) 145, base transceiver station 150, and base transceiver station 155.

Base transceiver station 145, base transceiver station 150, and base transceiver station 155 may be controlled by a base station controller (BSC) 160. Base station controller 160 and the base transceiver stations 145, 150, and 155 may together form a base station subsystem (BSS) 135. Depending on the embodiment, a number of base station subsystems may be controlled and monitored by a mobile switching center (MSC). For example, system 100 may have two base station subsystems, 135 and 185, controlled and monitored by mobile switching center 180, with each base station subsystem coupled to mobile switching center 180 via land lines such as landline 175.

In an embodiment, one or more base station subsystems and mobile switching stations may facilitate the transfer of information for wireless communication devices. For example, a wireless carrier may charge customers for the service of transferring digital information between users of the wireless communication devices via the base station subsystems and mobile switching stations. Usage of the service may be tracked by the wireless communication devices and communicated to the users via ambient elements of the wireless communication devices.

Mobile switching center 180 may comprise a gateway to public switched telephone network (PSTN) 165. Computers located within public switched telephone network 165 may store various databases that contain information about the accounts of users of smartphone 125 and cell phone 115. For example, a computer owned by a wireless carrier may store rate plan information for the user of cell phone 115 and contain actual usage data as the user talks and uses data services during successive billing periods. Mobile switching centers in a system may be coupled to the public switched telephone network via communication trunks. As FIG. 1 illustrates, mobile switching center 180 couples to public switched telephone network 165 via trunk 170.

Public switched telephone network 165 may comprise innumerable public circuit-switched telephone networks, such as numerous public circuit-switched telephone networks owned and operated by commercial providers of wireless services, or wireless carriers. For example, a wireless carrier may provide wireless communications services to millions of subscribers, or users, such as the users of smartphone 125 and cell phone 115.

The wireless carrier may operate wireless communication equipment within public switched telephone network 165 and allow the users of smartphone 125 and cell phone 115 to communicate with other people via communication towers 130 and 140, base station subsystem 135, and mobile switching center 180. In other words, the users of smartphone 125 and cell phone 115 may communicate with other people via the hardware of public switched telephone network 165, mobile switching center 180, base station subsystem 135, and communication towers 130 and 140. Such communication may comprise talking, sending pictures, receiving e-mails, listening to digital audio broadcasts, and watching live television, as just a few examples. Owners and subscribers may pay for the usage of these communication services.

In different embodiments, the providers of the wireless communications services may have service contracts with owners of wireless communication devices. For example, a wireless carrier may have a service contract or service agreement with the owner of cell phone 115. The service contract may include 500 peak minutes and 3000 night/weekend minutes. The wireless carrier may store information of the service agreement for the owner of cell phone 115 in a computer database coupled with communication equipment of public switched telephone network 165.

As the owner or a user talks on cell phone 115, such usage may consume the peak and night/weekend minutes allotted for a particular billing period. As the owner continues to talk, cell phone 115 may manipulate an ambient element of cell phone 115 to indicate or indicate usage information to the owner. For example, if the owner consumes 400 peak minutes during the first two weeks of a four week billing cycle, cell phone 115 may determine that the usage reaches a predetermined threshold of 350 minutes, manipulate an ambient element on a display of cell phone 115, and cause the ambient element to turn from green to red or from one color to another based on a color scheme.

In some embodiments, one or more wireless communication devices may work in tandem in some form when one of the wireless communication devices manipulates an ambient element to indicate the usage information. One example of tandem operation may be when several users share a service of a single rate plan. For example, the users of smartphone 125 and cell phone 115 may be mother and daughter, respectively, on a family rate plan. The mother and daughter may share a limited number of daytime minutes during a billing cycle or billing period. The mother may monitor usage of the daytime minutes, such as how many daytime minutes remain in the billing period, via the manipulation of an ambient element on smartphone 125.

Alternatively, instead of indicating common or shared usage information, the mother may configure smartphone 125 to indicate usage information allotted or specifically assigned to cell phone 115, such as a number of text messages sent and/or received by the daughter during the billing period. For example, the family rate plan may allow each wireless communication device to send a maximum of fifty text messages per billing period without incurring any additional charges or usage fees.

A service contract may provide that an owner may send a limited quantity of data each billing period. For example, a service contract may provide that an owner of smartphone 125 can transfer one gigabyte (1 GB) of information via smartphone 125 during a billing period. The owner may use smartphone 125 to surf the Internet via a browser of smartphone 125, send and receive e-mail messages, and share digital pictures with family members during a span of the billing period, which may be a month. The transfer of the information may comprise sending and/or receiving data.

As smartphone 125 transfers the information during the billing period, smartphone 125 may keep track of the quantity of information transferred during the billing period and manipulate an ambient element to indicate how much additional information may be transferred during the billing period. For example, as the owner transfers information and approaches the 1 GB usage limit, smartphone 125 may manipulate an ambient element on a display of smartphone 125 to indicate the data usage information to the owner.

In some embodiments, usage information may be stored in the communication device. For example, cell phone 115 may tally the number of text messages sent and received during a billing period. As the number of text messages approaches a limit provided in the service contract, cell phone 115 may manipulate an ambient element on the display, communicating the text message usage to the owner.

In other embodiments, usage information may be tracked and stored in one or more computers of the provider of the wireless communications services. For example, a computer of a wireless carrier located within public switched telephone network 165 may keep track of the total number of minutes that a user talks on smartphone 125 during a billing period. In order to indicate or indicate the usage information for the number of minutes that the user has consumed smartphone 125 may periodically send a request via communication tower 130, base station subsystem 135, and mobile switching center 180, requesting the computer of the wireless carrier to send the total number of minutes. The computer may respond and transmit the total number of minutes that the user has consumed, or potentially the percentage of minutes/data used relative to a limit of a rate plan during the billing period, back to smartphone 125. Smartphone 125 may receive the usage information and use the information to determine how to adjust or manipulate an ambient element on the display of smartphone 125 in order to indicate the usage information to the owner. For example, smartphone 125 may compare the usage information with one or more usage limits to determine when the amount of usage reaches or exceeds thresholds relative to the usage limit.

In further embodiments, usage information may be stored by both a communication device and a computer of the provider of the wireless communication services. For example, in one embodiment smartphone 125 may keep track of the total number of voice minutes used, the total quantity of data transferred, and the total number of text messages sent and received by a user of smartphone 125.

Smartphone 125 may use the internally-tracked information to manipulate one or more ambient elements on the display of smartphone 125 to communicate the amount of usage to the user of smartphone 125. However, because the internally-tracked information may not match the information captured and stored by a computer of the wireless carrier, which may be used for actual billing purposes, smartphone 125 may periodically request the actual or official usage information from the computer of the wireless carrier and use the information to manipulate ambient elements on the display and indicate the actual usage information to the user of smartphone 125.

In even further embodiments, some usage information may be stored on the communication device while other usage information is stored on a computer of the wireless carrier. For example, smartphone 125 may keep track of the total number of text messages and/or the amount of data transferred to and from smartphone 125, while the computer of the wireless carrier tabulates the number of voice minutes used.

Different types of wireless communication devices may indicate usage information via ambient elements. For example, a user of a satellite phone 110 may communicate with other people via satellite 105. Satellite dish 120 may transmit and receive voice and data information between satellite 105 and public switched telephone network 165. The user of satellite phone 110 may have a rate plan that limits the use of satellite phone 110 to only 300 minutes per month, with any minutes used in excess of the 300 minutes costing a premium. To help the user of satellite phone 110 avoid using too many minutes, satellite phone 110 may continually alter an ambient element of satellite phone 110 to indicate usage information during the month and help the user avoid going beyond the rate limit of the rate plan.

In different embodiments of system 100, the types and numbers of system components may vary. For example, while system 100 of FIG. 1 only shows two communication towers, many systems may have tens or hundreds of communication towers. Other systems may have tens or hundreds of base station controllers coupled with varying numbers of base transceiver stations and varying numbers of mobile switching centers.

The methods and technologies to transfer information between the wireless communication devices and other components of a system may vary from embodiment to embodiment, and even from component to component in a single embodiment. For example, in one embodiment cell phone 115 may have a power transmission rating of three watts and transmit voice signals using an analog methodology via radio frequencies. In another embodiment cell phone 115 may have a power transmission rating of 0.5 watts and transmit voice and data signals using a digital methodology via microwave frequencies.

In various embodiments of system 100 the wireless communication devices may use varying technologies to transfer voice and data information. For example, one or more wireless communication devices may employ advanced mobile phone service (AMPS) technology, global system for mobile (GSM) communication technology, and/or personal communication service (PCS). One or more wireless communication devices may operate on frequency bands around 800 and 900 megahertz (MHz) while other wireless communication devices operate at frequencies near 1,900 MHz. Alternative embodiment wireless communication devices may operate at frequencies other than the 800 MHz, 900 MHz, and 1,900 MHz bands. Various wireless communication devices may also employ time-division multiple access (TDMA), code-division multiple access (CDMA), or a combination of both TDMA and CDMA. Some wireless communication devices may employ a different multiple access technology, other than TDMA and CDMA, while other wireless communication devices employ no multiple access technology.

In many of the embodiments, one or more of the wireless communication devices may support various types of service technologies. For example, a wireless communication device may use a short message service (SMS) communication protocol for text messaging. The wireless communication device may also use employ another service, such as a multimedia messaging service (MMS), to transfer other types of data for images, audio, video, and rich text, such as e-mail, packet switching data for the Internet, and gaming data as examples. As a specific example, a wireless communication device may have a camera with video recorder and employ MMS for sending and receiving photos and multimedia clips. In alternative embodiments, the wireless communication devices may support other types of services, such as mobile instant messaging and mobile e-mail. In further embodiments, the wireless communication devices may also support services such as simple mail transfer protocol (SMTP) over transmission control protocol/Internet protocol (TCP/IP). Usage of services that employ one or more of these technologies may be conveyed via ambient elements.

Various wireless communication devices may support one or more of the many communication standards. For example, one wireless communication device may support general packet radio service (GPRS) and universal mobile telecommunications system (UMTS) communication standards. Another wireless communication device may support evolution-data optimized (EV-DO), while yet another wireless communication device may support enhanced data rates for GSM evolution (EDGE) and Super 3G. As one skilled in the art will readily appreciate, there are numerous communication technologies and standards which various wireless communication devices may employ alone or in combination in various embodiments. Usage of services that employ one or more of these standards may also be conveyed via ambient elements.

To enable one to understand how an apparatus may communicate usage information to a user via ambient elements, we can first examine some of the aspects and properties attributed to ambient elements. Ambient elements may present information to a person through subtle changes in light, sound, form, color, smell, temperature, or movement, which may be processed by the person in the background of his or her awareness. In other words, an ambient element may communicate information to the person in a subconscious manner, while the person may be focusing his or her attention on a different subject. For example, a user may only have 100 minutes remaining out of 500 minutes for a rate plan in a billing period. Instead of displaying the number of remaining minutes on a screen of a cell phone, which requires the user to focus his or her attention to comprehend that the number of minutes are starting to run low, the cell phone may instead decrease the call volume in proportion to the number of minutes remaining. While the user is talking on the phone, she may subconsciously perceive that her minutes are starting to run low as the volume of the voice of the other person decreases during the conversation. She may perceive that she has few minutes remaining without having to navigate through a series of menu items and read a number on the screen of her cell phone.

Figure 2A:
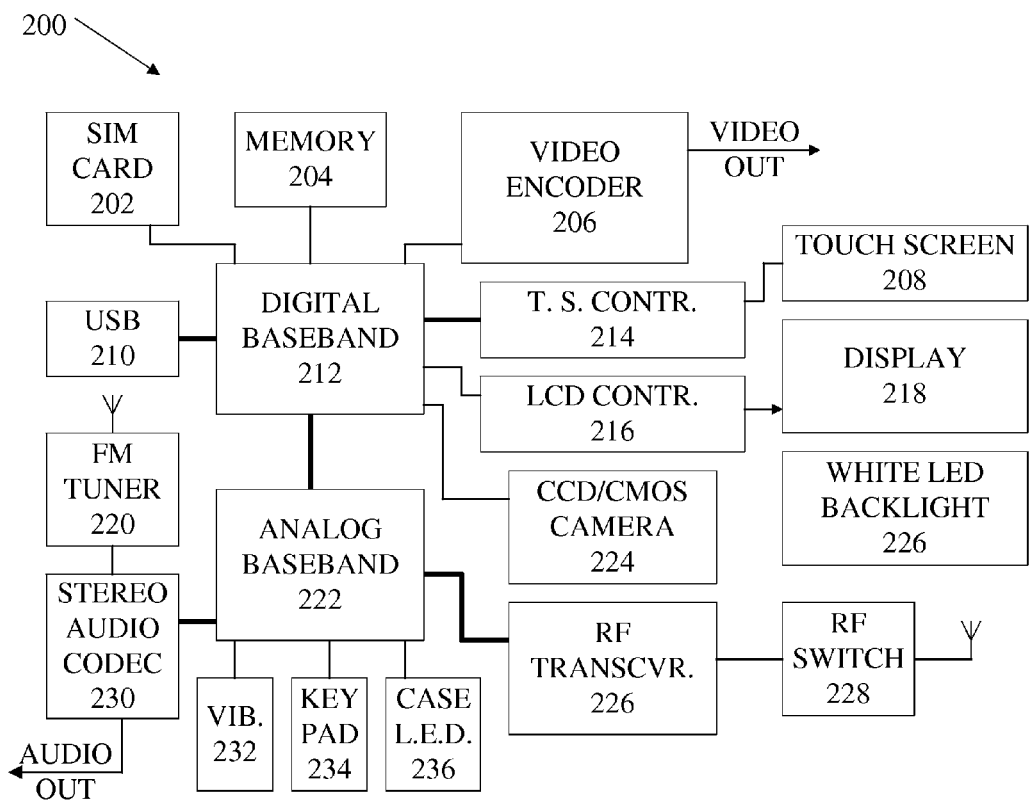
FIG. 2A shows an apparatus that may manipulate numerous ambient elements to indicate usage information.

To provide a more detailed illustration of how an apparatus may manipulate numerous ambient elements to indicate usage information, we turn now to FIG. 2A. FIG. 2A depicts an apparatus 200 that may manipulate or alter one or more ambient elements in order to indicate usage information to a user of a wireless communication device, such as cell phone 115, smartphone 125, or satellite phone 110 described in the discussion for FIG. 1. In one or more embodiments, apparatus 200 may be part of a cell phone, a smartphone, or other portable wireless communication device. A wireless communication device may have modules that enable communication of both analog information and digital information. For example, apparatus 200 comprises two different modules, digital baseband 212 and analog baseband 222.

In one or more embodiments digital baseband 212 may be an integrated circuit chipset comprising a processor, cache memory, a shared memory controller, timers, and interrupt controller, static random access memory (SRAM), and secure read-only memory (ROM). For example, digital baseband 212 may execute instructions of an operating system and programs stored in memory 204. Analog baseband 222 may comprise an integrated circuit chipset for transferring information between apparatus 200 and a communication tower, via radio frequency transceiver 226 and radio frequency switch 228. An antenna may send and receive communication signals to and from the communication tower, whereupon radio frequency switch 228 switches between the appropriate sending and receiving frequencies as radio frequency transceiver 226 generates and receives the modulated signals. For example, analog baseband 222 may receive packets of a digitally encoded live video broadcast via radio frequency transceiver 226 and radio frequency switch 228. Upon receiving the digitally encoded signals of the packets from radio frequency transceiver 226, analog baseband 222 may transfer the packets to digital baseband 212 for decoding and further processing to display the broadcast on display 218. Receiving and viewing the video broadcast may be a service provided by a wireless carrier. Information related to usage of the service may be conveyed via ambient elements apparatus 200.

Apparatus 200 may have one or more subscriber identity key module (SIM) cards, such as SIM card 202. SIM card 202 may comprise a removable smart card integrated circuit and be used to identify the subscriber or owner of apparatus 200 when interacting with the various wireless communication services. In some embodiments, SIM card 202 may store information used by apparatus 200 when determining how to manipulate or alter an ambient element to indicate usage information. For example, SIM card 202 may store rate plan information, such as how many night-and-weekend minutes the subscriber is entitled to for each billing period and how many minutes have actually been consumed during a specific billing period.

Usage information may also be stored in memory 204. The types of memory devices comprising memory 204 may vary in different embodiments. In numerous embodiments, memory 204 may comprise volatile memory elements, such as a 512 megabyte (Mb) dynamic random access memory (DRAM) chip in one embodiment. In alternative embodiments, memory 204 may comprise nonvolatile memory. For example in an alternative embodiment memory 204 may comprise a flash memory module, such as a 1 GB flash memory device. Digital baseband 212 may work in conjunction with memory 204 when calculating or determining usage information, such as by tracking a total number of bytes transferred during a billing cycle. That is to say, digital baseband 212 may monitor the amount of data sent and received by apparatus 200. As the total amount of data sent and received increases during a billing period, digital baseband 212 may store the total in memory 204.

Apparatus 200 may have a connector for a universal serial bus (USB) 210. For example, apparatus 200 may comprise a smart phone with an integrated personal digital assistant (PDA), such as a Palm®Treo™. USB 210 may allow a user to transfer information between apparatus 200 and other electronic devices, such as synchronizing data files between apparatus 200 and a desktop computer. A user may send one or more such files, which may be, e.g. a picture of a family member, from apparatus 200 via a wireless communication service provided by a wireless carrier. Sending and/or receiving such files may be a type of usage tracked by apparatus 200 and conveyed to a user of apparatus 200 via one or more ambient elements.

As FIG. 1 illustrates, apparatus 200 has numerous modules which control the display of information to a user of apparatus 200. Liquid crystal display (LCD) controller 216 may receive display information from digital baseband 212 and present the information on display 218. For example, LCD controller 216 may receive alphanumeric characters or video picture information from digital baseband 212 and control display 218 so that a user may observe the characters or video. Touch screen controller 214 may sense user selection and operation via touch screen 208. For example, a user of apparatus 200 may select how many services are monitored and which ambient elements are altered to indicate usage information for those services. For instance, the user may have a rate plan which includes both voice and data services from a wireless carrier. However, the user may desire to have apparatus 200 only indicate usage information pertaining to daytime or peak minutes. To have apparatus 200 only indicate usage of daytime minutes, the user may use touch screen 208 to navigate through a series of drop-down menus and make appropriate menu selections, configuring apparatus 200 to only manipulate a single ambient element corresponding to usage of daytime minutes.

In numerous embodiments, digital baseband 212 and LCD controller 216 may manipulate or alter one or more ambient elements displayed on display 218. For example, display 218 may comprise a 320×320 pixel resolution color LCD screen. Based on calculated usage of a service by digital baseband 212, LCD controller 216 may gradually decrease the display resolution of screen items presented via display 218, such that the effective resolution presented on display 218 when a user approaches a rate plan service limit is 100×100 pixels.

Resolution as an alterable ambient element is just one example. Other examples of altering ambient elements include gradually changing displayed characters from green to red, altering luminance, hue, saturation, or color value, and changing brightness of display 218. For example, when the user approaches a rate plan service limit digital baseband 212 may manipulate or control white light emitting diode (LED) backlight 226, causing display 218 to dim more and more as usage of the service increases.

Apparatus 200 may have a charge-coupled device/complementary metal oxide semiconductor (CCD/CMOS) camera 224 for taking pictures or capturing live video. For example, a user of apparatus 200 may capture a video clip of his son scoring a touchdown, wherein digital baseband 212 captures the video clip via CCD/CMOS camera 224 and stores the video clip in memory 204 for later playback via video encoder 206. Apparatus 200 may also have a frequency modulated (FM) tuner 220 coupled with a stereo audio coder/decoder (CODEC) 230, enabling a user of apparatus 200 to listen to and potentially record an FM broadcast. For example, apparatus 200 may comprise part of a smartphone with built in FM tuner 220. The user may record a series of songs as one or more digitally encoded files, such as a series of MPEG-1 Audio Layer-3 (MP3) files, and stores the files in memory 204.

A user may choose to send the MP3 files, and the previously mentioned video file, to her friend by transmitting the files via radio frequency transceiver 226 and radio frequency switch 228. However, sending the MP3 and video files to her friend may consume a portion of her monthly allotted data transfer limit. For example, her rate plan may provide that she may send up to 200 MB of data during a single billing period without incurring any usage penalty fees.

Digital baseband 212 may track the total quantity of data transferred via apparatus 200 during the billing period and manipulate an ambient element to indicate data transfer usage information to the user. For example, digital baseband 212 may cause analog baseband 222 to periodically activate vibration module 232 whenever apparatus 200 is in the process of transferring data. As the quantity of transferred information increases, such as by approaching the 200 Mb rate plan limit, digital baseband 212 may cause analog baseband 222 to activate vibration module 232 with increasing amounts of vibration, or to vibrate more frequently, as the total quantity of data transferred increases.

In many embodiments, apparatus 200 may also have a keypad such as keypad 234. Apparatus 200 may indicate usage information via keypad 234. For example, at the beginning of a billing period apparatus 200 may backlight the keys of keypad 234 with a dark green color. As the user consumes night-and-weekend minutes, apparatus 200 may gradually change the backlight of the keys from dark green to light green, from light green to yellow, from yellow to orange, and from orange to red.

Alternatively, apparatus 200 may manipulate another ambient element to indicate usage of the night-and-weekend minutes. For example, apparatus 200 may comprise a cell phone having a clear or translucent plastic case. As the user consumes night-and-weekend minutes, apparatus 200 may gradually change the color of light emitted from case light emitting diodes (LED) 236, such as by changing the color from green to blue, blue to yellow, and from yellow to red. Alternatively, apparatus 200 may gradually change the intensity of the light emitted from case LED 236.

Figure 2B:
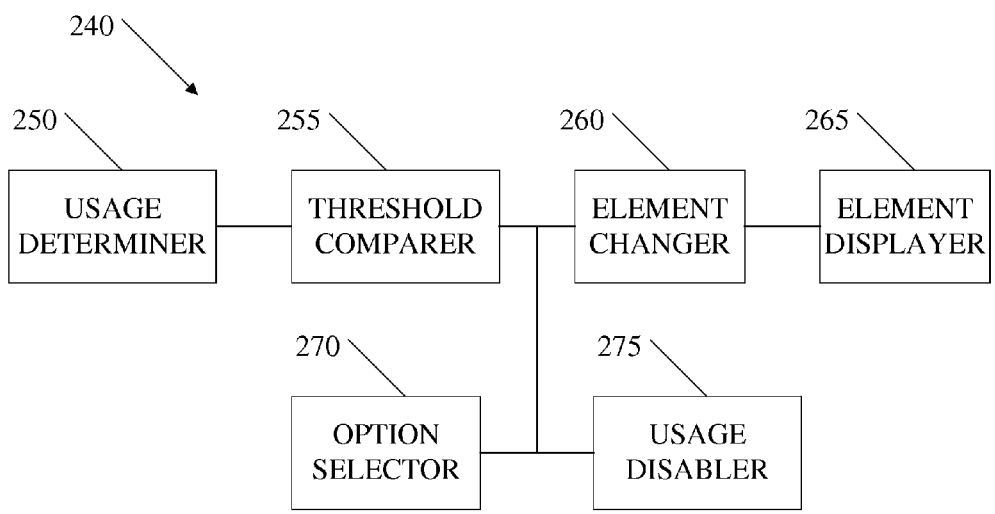
FIG. 2B depicts one embodiment of an apparatus that may determine usage and change an ambient element of a display.

FIG. 2B shows an apparatus 240 that may manipulate numerous ambient elements to indicate usage information. The embodiment of apparatus 240 shown in FIG. 2B has a usage determiner 250, a threshold comparer 255, an element changer 260, and an element displayer 265.

One or more elements of apparatus 240 may be in the form of hardware, software, or a combination of both hardware and software. For example, in one embodiment, one or more of the modules of apparatus 240 may comprise software instructions of an application stored in a tangible medium, executed in memory by a processor. In other words, one embodiment of apparatus 240 may comprise portions of stored code for an application, which may monitor usage of a service for a wireless communication device, such as satellite phone 110 shown in FIG. 1.

In alternative embodiments, one or more of the modules of apparatus 240 may comprise hardware-only modules. For example, in one embodiment element displayer 265 and element changer 260 may comprise a color display screen and a display controller integrated circuit that show images on the display screen, respectively. In such an embodiment, element displayer 265 and element changer 260 may not execute any software instructions, but instead respond to various input signals to produce and manipulate images.

In some embodiments, usage determiner 250, threshold comparer 255, element changer 260, and element displayer 265 may all reside in a single device, such as smartphone 125. For example, usage determiner 250 and threshold comparer 255 may comprise a processor that executes instructions to track the number of days that have elapsed in a billing cycle, tracks the number and type of minutes that a user talks on smartphone 125, determines the number of minutes remaining in the billing period, based on the number of days elapsed and the number of minutes consumed, and determines whether the number of minutes or other amounts of usage reach or go beyond one or more thresholds. For example, the processor executing the instructions may determine when the amounts of usage thresholds of 10%, 20%, 50%, 90%, 98%, and 105% of a usage limit of a rate plan are reached or exceeded.

Element changer 260 may comprise an LCD controller, such as LCD controller 216 shown in FIG. 2A. Even further, element displayer 265 may comprise an LCD display screen, such as display 218 shown in FIG. 2A, which may also be located in smartphone 125. Based on the number of minutes remaining in a billing period calculated by usage determiner 250, the LCD controller may subtly alter the background color of an image displayed on the LCD display screen to indicate the usage information.

Alternatively, depending on the embodiment, the elements of apparatus 240 may reside in two or more devices. For example, in one alternative embodiment, one or two of the elements of apparatus 240 may reside in a wireless communication device, such as cell phone 115, while the remaining elements reside in other devices, such as in computers of a wireless carrier. For example, element changer 260 and element displayer 265 may comprise hardware elements in cell phone 115, while usage determiner 250 comprises a separate device coupled to cell phone 115. In such an embodiment, usage determiner 250 may track usage of one or more services provided by the wireless carrier, such as how much data a user has transferred during a billing period, and transmit the usage information to cell phone 115 whenever cell phone 115 requests the usage information. Upon receiving the usage information, element changer 260 and element displayer 265 may manipulate or alter an ambient element, shown via element displayer 265, corresponding to the magnitude of the usage.

In another alternative embodiment, only one element, such as element displayer 265, may comprise part of a wireless communication device. The remaining elements may reside as hardware and/or software modules of an apparatus or system operated by a wireless service provider. For example, usage determiner 250, threshold comparer 255, and element changer 260 may comprise software modules executed by one or more computers of the wireless service provider that monitor or track usage of one or more services, determine when such usage at least reaches certain thresholds like 10% thresholds of a usage limit defined by a usage plan or rate plan, and determine when to change one or more elements of the wireless communication device. To change the device, one computer of the wireless service provider may generate and transmit a specific usage number to the wireless communication device. Different usage numbers may correspond to different colors to be displayed on a wireless communication device; e.g., a color number of 0 for black, a color number of 1000 for white, 900 for one yellow color, 300 for one red color, and 600 for a green color, with other color numbers corresponding to other colors being possible. Alternatively, in other embodiments, the usage number may be used by the wireless communication devices to change the ambient elements in different ways, such as by changing the illumination, L.E.D. brightness, and vibration.

Apparatus 240 may vary in different embodiments. Some embodiments may have fewer modules than those module depicted in FIG. 2B. For example, one embodiment may not have separate modules for element changer 260 and element displayer 265. That is to say, element changer 260 and element displayer 265 may be combined in a single module.

In other embodiments, apparatus 240 may include one or more additional modules. One embodiment may have a usage reception module to receive usage information from another device, such as a number for a percentage used or a percentage remaining of a service. Other embodiments may have a usage disabler 275 to give the user the option of preventing the element changer from changing an ambient element on the screen. Some embodiments may also include additional elements, such as an option selector 270 to enable the user select a color scheme and/or a usage disabler to prevent or disable the element changer from changing the ambient element on the screen.

Additionally, some embodiments may have different elements perform different functions. For example, some embodiments may not have an element displayer 265 but instead have an element producer. For example, in at least one embodiment the element producer of may comprise a speaker or buzzer that the embodiment causes to emit a periodic sound. If the usage is very low the embodiment may cause the speaker to periodically emit a relatively low frequency sound, such as a 40 to 50 hertz (Hz) buzzing sound. As the usage increases the embodiment may cause the speaker to periodically emit increasingly higher frequency buzzing sounds, such as by increasing the frequency of the buzzing sound by 100 Hz for each percentage of the usage range defined by a rate plan. Alternatively, an embodiment may produce a barely perceptible hum on the speaker as a person talks, either periodically or continuously.

To provide some illustrative examples of how an apparatus or a wireless communication device may indicate usage information via ambient elements we turn now to FIGS. 3A through 3H. FIGS. 3A-3H illustrate how ambient elements of a smartphone 300 may indicate usage information. In one or more embodiments, smartphone 300 may comprise a wireless communication device in a system like system 100.

Usage information may relate to a service provided by a provider of services for wireless communications, such as a wireless carrier. Some examples of the types of services that the provider may offer are sending and receiving e-mail; retrieving information related to news, entertainment, or stock quotes from the Internet or other network via a browser; playing games; watching television or Internet broadcasts; sending text messages; communicating or interacting with other devices such as PDAs and MP3 players; and providing navigation information via a global positioning satellite (GPS) module.

The provider of these wireless services may offer each service to subscribers via one or more rate plans. For example, a subscriber or user may select a rate plan that offers 1000 minutes of voice communication that may be used at any time, a maximum of 500 text messages that may be sent or received, and a maximum allowable data transfer limit of 2 GB. Embodiments may track and indicate usage information via ambient elements for one or more of the services of the rate plan, such as by altering an element or indicator on a display as the usage approaches the limit defined by the rate plan.

As shown in FIG. 3A, smartphone 300 may have a display 310. Display 310 may comprise, e.g., a color LCD screen. To indicate usage information of a service, smartphone 300 may manipulate an element such as ambient element 320 depicted in FIG. 3B. For example, during the month ambient element 320 may alert the user of smartphone 300 that he is approaching his rate plan limit for one of the services of the rate plan, such as the number of text messages. At the beginning of a billing period, when 100% of the messages are available, ambient element 330 of display 310 may glow green, as illustrated in FIG. 3C.

As the user sends and/or receives text messages during the month, the accumulated number of text messages may approach the limit of the rate plan. For example, if the usage approaches 60% of the limit, ambient element 340 of display 310 may fade to yellow, as illustrated in FIG. 3D. As the user continues to send and/or receive text messages and approaches the limit of the rate plan, such as within 20% of the limit, the color of ambient element 350 may fade to red as illustrated by FIG. 3E.

These thresholds of 100%, 60%, and 20% are illustrative of only one embodiment. The values for the thresholds may vary in different embodiments and may be configurable at the time the phone is purchased. Alternatively, in another embodiment, the user may select the threshold amounts and/or the colors by choosing a color scheme or setting a preference of smartphone 300.

Additionally, the change or manipulation of the ambient element may occur gradually, such as by slightly changing color for each percentage of the limit consumed, or the change may occur instantaneously, such as by swapping from green to yellow. An example of an instantaneous change of an ambient element may be that ambient element 320 is one shade of green while the usage varies from 100% to 61%. However, as soon as the percentage exceeds a threshold of 60.999%, smartphone 300 may change the displayed color from green to yellow. In a like fashion, smartphone 300 may change the displayed color from yellow to red at a threshold of 20.999%.

Changing ambient elements of wireless communication devices to indicate usage information may be provide users with clear indicators that they are consuming their minutes in a rapid fashion and are approaching a situation where they may face paying overage charges. For example, the users may not have to navigate a complicated series of menus to find the information. Plus, the use of ambient elements to indicate usage information may help train the users to be more careful in their use of the wireless communication devices. For example, the users may shorten their calls or turn off their phones at night in order to prevent receiving text messages.

Additionally, in the scenarios where service agreements involve discontinuing services for users that have reached their limits for billing periods, the use of ambient elements may also help the users avoid having the services discontinued. For example, by having the ambient elements indicate usage information, a teenager may avoid the situation where the cell service is shut off just when a parent needs to reach him or her, such as when he or she is in trouble and needs help.

While various embodiments may compare amounts of usage with one or more usage thresholds in an increasing manner, other embodiments may compare the amounts of usage with one or more usage thresholds in a decreasing manner. For example, in one embodiment the amount of usage may be a number that increases as a person uses a service, such as the number of minutes consumed. In such an embodiment, the ambient element may change colors as the consumed number of minutes increases. Alternatively, in another embodiment, the amount of usage may be a number that decreases as the person uses the service. An example may be when the number represents the number of minutes remaining in a billing period. At the beginning of the billing period, the amount of minutes remaining may be relatively large but decrease as the user talks on the communcation device. In such an alternative embodiment, the ambient element may change colors as the remaining amount of minutes decreases.

While the embodiment illustrated in FIGS. 3C through 3E may change an ambient element comprising a band encircling the perimeter of display 310, other embodiments may change different elements, such as an ambient element that spans one of the four sides of display 310. Alternatively, a wireless communication device may indicate usage information by changing other types of ambient elements. An example of changing another type of ambient element is illustrated in FIGS. 3F through 3H.

FIG. 3F shows how smartphone 360 may show or display an ambient element comprising an ambient picture. At the beginning of a billing period, smartphone 360 may obtain the remaining percentage amount of a service, which may be 100%, wherein smartphone 360 may display the ambient picture with full intensity (element 370) as shown in FIG. 3F. As the user of smartphone 360 uses the service tracked via the ambient picture, smartphone 360 may periodically obtain the remaining percentage amount and decrease the intensity of the ambient picture, such that smartphone 360 displays the ambient picture at half-intensity (element 380) when the user consumes approximately 50% of the billing period service amount. For example, the user may have transferred one hundred text messages out of a rate plan limit of two hundred text messages per month. Once the user has sent and/or received one hundred and ninety text messages, out of the rate plan limit of two hundred, smartphone 360 may display the ambient picture with a relatively low intensity (element 390), as depicted in FIG. 3H.

Figure 4:
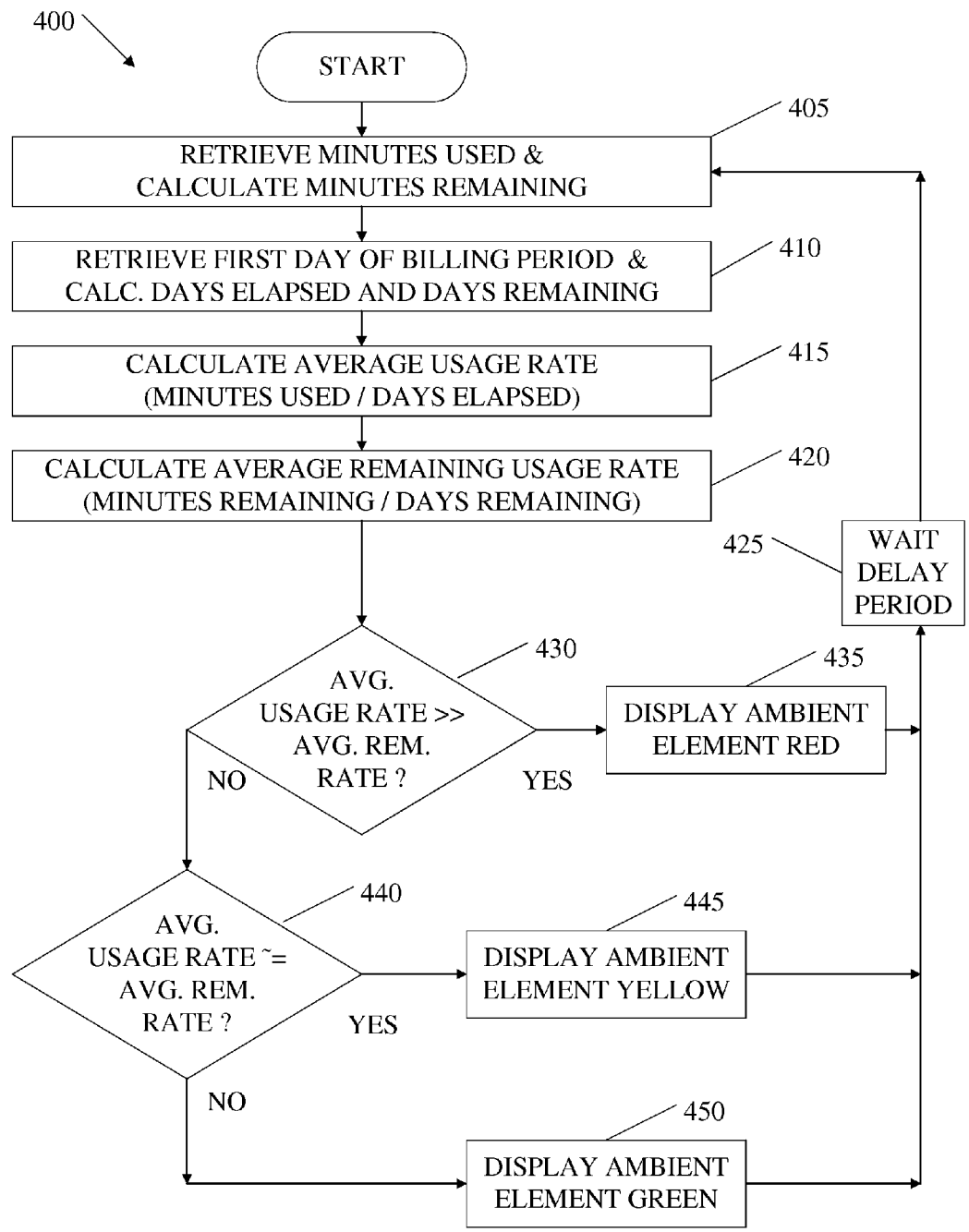
FIG. 4 depicts a flowchart illustrating how a wireless communication device may track usage and change colors of an ambient element to indicate usage of a service of the wireless communication device.

FIG. 4 depicts a flowchart 400 of a process illustrating how a wireless communication device may track usage and change colors of an ambient element to indicate or indicate the usage. For example, one or more embodiments may be implemented as a computer program product comprising a computer readable storage medium including instructions that, when executed by a processor track usage and change colors of an ambient element to communicate usage information of the wireless communication device. Alternatively, the process of flowchart 400 may be implemented in hardware, such as in a state machine of a wireless communication device, such that the state machine causes the device to carry out the process illustrated by flowchart 400.

As illustrated in FIG. 4, the process may involve obtaining or retrieving the minutes used and calculating the number of minutes remaining (element 405). For example, a smartphone may send a request to a wireless carrier asking the carrier to send the actual number of minutes that may have been used or consumed during a billing period and the number of minutes that are included in the rate plan of the user. Based on information received, the smartphone may subtract the actual number of minutes used from the number of minutes of the rate plan to determine the number of minutes remaining in the billing period. The process may further involve retrieving the first day of the billing period, calculating the number of days that have elapsed, and calculating the number of days remaining in the billing period (element 410).

Continuing with our example, the smartphone may send a request to the wireless carrier asking the wireless carrier to send the starting date of the billing period, and the number of days in the billing period if the number of days differs from thirty. Using the information received from the wireless carrier, the smartphone may calculate or determine the number of days that have elapsed by comparing the starting date with the present date. The smartphone may compare the number of days that have elapsed with the number of days in the billing period to calculate the number of days remaining in the billing period.

The smartphone may divide the number of minutes used by the number of days that have elapsed to calculate an average usage rate (element 415). For example, the rate plan may provide 300 minutes per each billing period of 30 days. On the 10th day of the billing period, the user may have consumed 100 of the minutes. Consequently, the smartphone may divide 100 minutes by 10 days to calculate the average usage rate of 10 minutes per day. The smartphone may also divide the number of minutes remaining by the number of days remaining in order to calculate an average remaining usage rate (element 420). Continuing with our example, the smartphone may divide 200 minutes by 20 days and determine that the user may continue using an average of 10 minutes per day and stay within the limits of the rate plan. In other words, the user may consume 300 minutes by the end of the billing period, which will be within the maximum number of minutes provided by the rate plan, provided the user continues talking an average of 10 minutes or less per day for the rest of the billing period.

The smartphone may use the calculated results in determining how to indicate usage information to the user via one or more ambient elements. If the calculated average usage rate is greater than the calculated average remaining usage rate (element 430), the smartphone may display an ambient element with a red color (element 435). For example, if the user consumes 200 minutes out of a 300 minute rate plan in the first 10 days of the 30 day billing period, the average usage would be 20 minutes per day which would be greater than the average remaining usage rate of 5 minutes per day.

If the calculated average usage rate is equal or approximately equal to the calculated average remaining rate (element 440), the smartphone may display the ambient element with a yellow color (445). For example, with our initial example the average usage rate of 10 minutes per day would equal the average remaining usage rate of 10 minutes per day. However, if the calculated average usage rate is less than the calculated average remaining usage rate (element 440), the smartphone may display the ambient element with a green color (element 450).

If the user consumes 50 minutes out of a 300 minute rate plan in the first 10 days of a 30 day billing period, the average usage would be 5 minutes per day which would be less than the average remaining usage rate of 12.5 minutes per day. The smartphone may then wait for a period of time (element 425) before calculating the average usage rate and the average remaining usage rate and altering the display of the ambient element. For example, the smartphone may only retrieve the data from the wireless carrier every 10 minutes when the user is talking on the phone.

Flowchart 400 of FIG. 4 illustrates only one process. Alternative embodiments may implement innumerable variations of flowchart 400. For example, instead of calculating the number of minutes remaining (element 405) and/or calculating the number of days that have elapsed and the number of days that are remaining (element 410), an alternative embodiment may simply request the number of minutes remaining, the number of days that have elapsed, and the number of days remaining from the wireless carrier. In other alternative embodiments the wireless communication device may display the ambient element or elements in differing numbers of colors with differing numbers of thresholds according to a color scheme which may, depending on the embodiment, be selected by the user. For example, a cell phone may cause an ambient element to transition from green to blue, blue to yellow, yellow to orange, and from orange to red at different percentage values of usage. Even further embodiments may display the ambient element in a continuous spectrum of colors, e.g., from white to black, as the usage changes.

Figure 5:
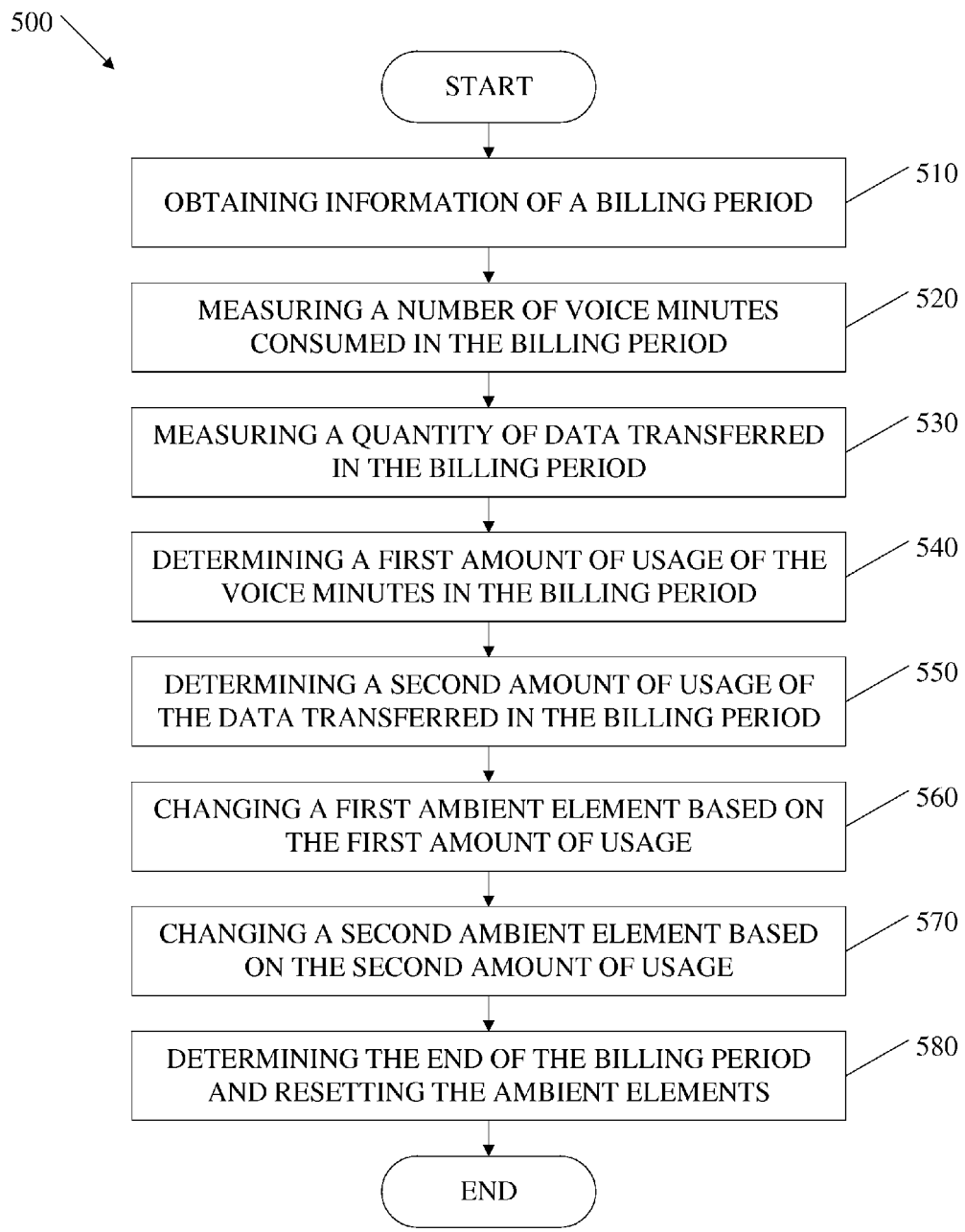
FIG. 5 illustrates a flowchart of a method for changing ambient elements to indicate usage information for a wireless communication device.

FIG. 5 illustrates a flowchart 500 of a method for manipulating ambient elements to indicate usage information for a wireless communication device. For example, smartphone 125 depicted in FIG. 1 may employ the method of flowchart 500 to indicate usage information to a user of smartphone 125. A method according to flowchart 500 may begin with obtaining information of a billing period (element 510). For example, the user of smartphone 125 may have rate plan described in a service agreement with a wireless carrier. The rate plan may have numerous usage limits that the user may want to not exceed. The rate plan may provide that the user may talk a total of 1000 minutes and transfer up to 2 GB of data during each billing period. For a billing period, smartphone 125 may also obtain information of the billing period, such as the starting and ending dates of a period spanning from October 6 to November 6, as well as the limits for voice minutes and data transfer. Smartphone 125 may obtain the billing information from the wireless carrier, such as by sending an automated request. Alternatively, in some embodiments, smartphone 125 may obtain the billing information from the user, such as by the user entering the information into smartphone 125 using a keypad.

During the billing period, smartphone 125 may determine when the billing period starts, such as via an internal calendar program, and measure or otherwise determine the amount of time that anyone talks otherwise uses smartphone 125 to send/receive voice information during the billing period (element 520). Smartphone 125 may also measure or determine how much data anyone transfers via smartphone 125 during the billing period (element 530). For example, within a couple of seconds after midnight on October 6 smartphone 125 may reset a voice minute counter and a data transfer accumulator in nonvolatile memory of smartphone 125. When anyone uses smartphone 125 to transfer voice and data information between the dates of October 6 and November 6, smartphone 125 may track or measure such usage via the voice minute counter and the data transfer accumulator.

An embodiment of flowchart 500 continues by determining a first amount of usage of the voice minutes (element 540) and determining a second amount of usage of the data transferred during the billing period (element 550). For example, every ten minutes smartphone 125 may compare the totals of the voice minute counter and data accumulator to the usage limits provided by the rate plan and calculate respective percentage amounts for the voice and data usage. For the sake of a more detailed illustration, smartphone 125 may measure or otherwise determine from the wireless carrier that the owner consumes a total of 600 voice minutes and transfers a total of 1.5 GB of data at some point in the billing period. Smartphone 125 may compare the 600 voice minutes and 1.5 GB totals to the usage limits of 1000 minutes and 2 GB and calculate percentage amounts of 60% and 75% for usage of the voice and data services, respectively.

An embodiment of flowchart 500 continues by changing a first ambient element based on the first amount of usage (element 560) and a second ambient element based on the second amount of usage (element 570) to indicate the usage to the owner. For example, smartphone 125 may indicate by changing a first bar on the leftmost side of a display of smartphone 125 corresponding to usage of the voice minutes.

As the owner talked on the phone and increased the total number of voice minutes used from 0% to 60%, smartphone 125 may have changed the display properties of the first bar, causing the first bar to change from a bright green color to yellow and then to orange. Similarly, as the owner transfers the 1.5 GB data, such as by watching video broadcasts and using a GPS service offered by the wireless carrier, smartphone 125 may change a second bar on the rightmost side of the display. Smartphone 125 may have manipulate the display properties of the second bar, causing the second bar to change from a bright green color to yellow to orange and then to a light shade of red.

An embodiment of flowchart 500 continues by determining the end of the billing period and resetting the ambient elements (element 580). For example, smartphone 125 may determine that the end of November 6 has passed, by using the internal calendar program, and reset the totals for the voice minute counter and the data transfer accumulator. Consequently, smartphone 125 may also manipulate the display properties of the first and second bars, causing the bars to change from their current colors to a bright green.

Figure 6:
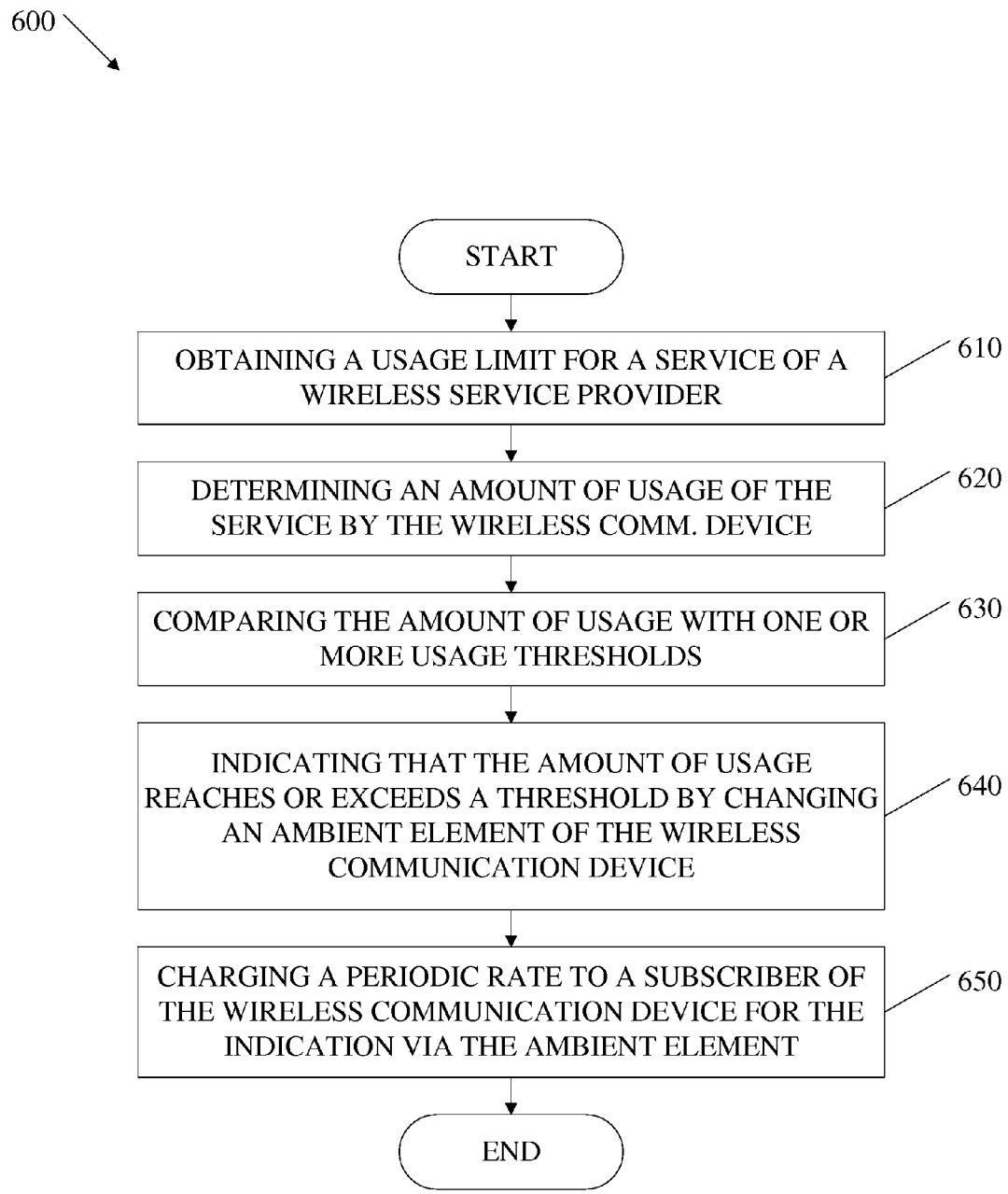
FIG. 6 depicts a flowchart of one alternative method for manipulating ambient elements to indicate usage information for a wireless communication device.

Flowchart 500 of FIG. 5 illustrates an embodiment of one method. FIG. 6 depicts a flowchart 600 of one alternative method for manipulating ambient elements to indicate usage information for a wireless communication device. Flowchart 600 illustrates a business method that a wireless service provider may use when providing a service to one or more subscribers. The wireless service provider may operate a networked system of communication devices in FIG. 1, employ the method of flowchart 600 to indicate usage information to a subscriber of cell phone 115, and charge the subscriber a periodic rate for providing the indication. For example, indicating usage information via one or more ambient elements of cell phone 115 may be, e.g., a $1.75/mo plan option that the subscriber adds to the plan to help avoid excessive usage fees.

A method according to flowchart 600 may begin with obtaining a usage limit for a service of the wireless service provider (element 610). For example, the subscriber or user of cell phone 115 may have rate plan that provides the subscriber a total of 12 hours of usage of a GPS service of cell phone 115 during each billing period. Obtaining the usage may comprise retrieving the usage limit of 12 hours from the wireless service provider, such as requesting the usage limit electronically via cell phone 115 or by storing the usage limit into cell phone 115 via a keypad. Alternatively, in another embodiment, obtaining the usage limit may comprise storing the usage limit into a computer database of the wireless service provider.

During a billing period, cell phone 115 may determine an amount of usage of the GPS service (element 620). For example cell phone 115 may have an internal timer or accumulator that measures and tracks the amount of time that cell phone 115 enables the GPS service during the billing period. Alternatively, in another embodiment, the GPS information may be sent from a communication network to cell phone 115, whereupon one or more computers of the wireless service provider may monitor the total amount of usage during the billing period.

As the subscriber uses the GPS service during the billing period, cell phone 115 or a computer of the wireless service provider may compare the amount of usage with one or more usage thresholds (element 630). For example, the subscriber may select an indication scheme which gradually changes a color of an ambient element from green to red in 5% thresholds of the usage limit of 12 hours. Cell phone 115 may compare the amount of usage with the 5% thresholds (element 630) and change the color of the ambient element as the amount of usage increases (element 640). In other words, the scheme may cause the color of the ambient element to change colors at each time the amount of usage increases by 5% of the usage limit (element 640).

Using one or more ambient elements of a wireless communication device to indicate the amount of usage may comprise an optional service for a rate plan offered by the wireless service provider. For example, to help avoid using the GPS service for more than 12 hours in a billing period, the subscriber may choose to pay an additional small fee each billing period, which enables the ambient indication feature (element 650).

Another embodiment is implemented as a program product for implementing systems and methods described with reference to FIGS. 1-5. Embodiments may take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments may take the form of a computer program product accessible from a computer-usable or computer-readable medium providing program code for use by or in connection with a computer or any instruction execution system. For the purpose of describing the various embodiments, a computer-usable or computer readable medium may be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code is retrieved from bulk storage during execution. Input/output or I/O devices (including but not limited to keyboards, displays, pointing devices, etc.) can be coupled to the system either directly or through intervening I/O controllers.

Those skilled in the art, having the benefit of this disclosure, will realize that the present disclosure contemplates indicating usage information of wireless communication devices via ambient elements. The form of the embodiments shown and described in the detailed description and the drawings should be taken merely as examples. The following claims are intended to be interpreted broadly to embrace all variations of the example embodiments disclosed.

Although the present disclosure and some of its advantages have been described in detail for some embodiments, one skilled in the art should understand that various changes, substitutions, and alterations can be made herein without departing from the spirit and scope of the disclosure as defined by the appended claims. Although specific embodiments may achieve multiple objectives, not every embodiment falling within the scope of the attached claims will achieve every objective. Moreover, the scope of the present application is not intended to be limited to the particular embodiments of the process, machine, manufacture, composition of matter, means, methods, and steps described in the specification. As one of ordinary skill in the art will readily appreciate from this disclosure, processes, machines, manufacture, compositions of matter, means, methods, or steps presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising: obtaining, by a wireless communication device, a usage limit for a service provided by a wireless service provider; determining, by the wireless communication device, an amount of usage of the service by the wireless communication device; comparing, by the wireless communication device, the amount of usage with one or more usage thresholds; and indicating, by the wireless communication device, that the amount of usage at least reaches a threshold of the one or more usage thresholds, wherein the indicating comprises changing an ambient element of the wireless communication device, wherein the ambient element is a hardware element, separate from a graphical user interface display of the wireless communication device, that outputs a visual indication; wherein the ambient element is a separate hardware-implemented light emitting band encircling the graphical user interface display of the wireless communication device, and changing the ambient element comprises changing colors of the separate hardware-implemented light emitting band encircling the graphical user interface display of the wireless communication device.

2. The method of claim 1, wherein changing colors of the light emitting band comprises controlling the light emitting band to output a first color light when the determined amount of usage is less than a first threshold of the usage limit and controlling the light emitting band to output a second color light, different from the first color light, when the determined amount of usage is greater than a second threshold of the usage limit.

3. An apparatus, comprising: a usage determiner to determine an amount of usage of a service of a wireless communication device; a threshold comparer to compare the amount of usage with one or more usage thresholds of a usage limit; and an element changer to change an operation of an ambient element of the wireless communication device in response to the amount of usage at least reaching a usage threshold of the one or more usage thresholds, wherein the ambient element is a hardware element, separate from a graphical user interface display of the wireless communication device, that outputs a visual indication; wherein the ambient element is a separate hardware-implemented light emitting band encircling the graphical user interface display of the wireless communication device, and changing the ambient element comprises changing colors of the separate hardware-implemented light emitting band encircling the graphical user interface display of the wireless communication device.

4. The apparatus of claim 3, further comprising at least one of an option selector to enable a user to select a color scheme for changes of colors of the ambient element and a usage disabler to prevent the element changer from changing the ambient element on the screen.

5. The apparatus of claim 3, wherein changing colors of the light emitting band comprises controlling the light emitting band to output a first color light when the determined amount of usage is less than a first threshold of the usage limit and controlling the light emitting band to output a second color light, different from the first color light, when the determined amount of usage is greater than a second threshold of the usage limit.

6. The apparatus of claim 3, wherein at least one of the usage determiner, the threshold comparer, and the element changer are in a computer of a base station subsystem, a mobile switching center, or a public switched telephone network.

7. A computer program product comprising: a computer readable storage device of a wireless communication device including instructions that, when executed by a processor of the wireless communication device, causes the processor to: receive a usage limit for a service provided by a wireless service provider; determine an amount of usage of the service by the wireless communication device; compare the amount of usage with one or more usage thresholds; determine that the amount of usage at least reaches a threshold of the one or more thresholds; and indicate that the amount of usage at least reaches the threshold by changing an ambient element of the wireless communication device, wherein the ambient element is a hardware element, separate from a graphical user interface display of the wireless communication device, that outputs a visual indication; wherein the ambient element is a separate hardware-implemented light emitting band encircling the graphical user interface display of the wireless communication device and changing the ambient element comprises changing colors of the separate hardware-implemented light emitting band encircling the graphical user interface display of the wireless communication device.

8. The computer program product of claim 7, wherein changing colors of the light emitting band comprises controlling the light emitting band to output a first color light when the determined amount of usage is less than a first threshold of the usage limit and controlling the light emitting band to output a second color light, different from the first color light, when the determined amount of usage is greater than a second threshold of the usage limit.

9. A method, comprising: obtaining a usage limit for a service provided by a wireless service provider; determining an amount of usage of the service, wherein the usage is via a wireless communication device; comparing the amount of usage with one or more usage thresholds; generating a usage output based on the comparing, wherein the usage output is a value that is used by the wireless communication device to control an output of an ambient element of the wireless communication device, wherein the ambient element is a hardware element, separate from a graphical user interface display of the wireless communication device, that outputs of a visual indication; and transmitting the usage number to the wireless communication device, wherein the usage number causes the wireless communication device to change the output of the ambient element of the wireless communication device based on the usage number, wherein the ambient element is a separate hardware-implemented light emitting band encircling the graphical user interface display of the wireless communication device and changing the output of the ambient element comprises changing colors of the separate hardware-implemented light emitting band encircling the graphical user interface display of the wireless communication device.

10. The method of claim 9, wherein the determining the amount of usage comprises monitoring usage of the service by a computer of a wireless carrier, wherein further the transmitting the usage output comprises transmitting a color number to change a color of light emitted by the ambient element.

11. A system, comprising: a wireless communication tower; at least one computer of a wireless service provider, the at least one computer coupled to the wireless communication tower, wherein the at least one computer comprises: a usage determiner to determine an amount of usage of a service of a wireless communication device; a threshold comparer to determine in response to the amount of usage exceeding one or more usage thresholds of a usage limit; and an element changer to change an operation of an ambient element of the wireless communication device based on the threshold comparer determining that the amount of usage exceeds a usage threshold of the one or more usage thresholds, wherein the ambient element is a hardware element, separate from a graphical user interface display of the wireless communication device, that outputs a visual indication; wherein the ambient element is a separate hardware-implemented light emitting band encircling the graphical user interface display of the wireless communication device and changing the output of the ambient element comprises changing colors of the separate hardware-implemented light emitting band encircling the graphical user interface display of the wireless communication device.

* * * * *